Sept. 26, 1950  W. S. WESCHLER ET AL  2,523,741
THROUGH BUSHING
Filed Jan. 31, 1946

INVENTORS
WILLIAM S. WESCHLER
& RICHARD P. CORPORON
BY C. D. Tuska
ATTORNEY

Patented Sept. 26, 1950

2,523,741

UNITED STATES PATENT OFFICE 2,523,741

THROUGH BUSHING

William S. Weschler, Camden, and Richard Pierce Corporon, Haddonfield, N. J., assignors to Radio Corporation of America, a corporation of Delaware Application January 31, 1946, Serial No. 644,610

2 Claims. (Cl. 248—56)

This invention relates to improvements in bushings and will be described as applied to the support of an inflexible concentric transmission line.

In television and other high frequency installations requiring the use of a concentric transmission line for connecting a cabinet mounted transmitter to an external terminal, such as an antenna, it is not always possible to achieve perfect mechanical alignment of the panel and wall apertures through which the transmission line must pass. When the transmission line comprises a prefabricated inflexible conduit it cannot, conveniently, be bent to compensate for the misalignment and, in the absence of such compensation, cannot be supported upon straight-through bushings of conventional design, at least without subjecting the panels to undue strain.

Accordingly, the principal object of the present invention is to provide an improved through bushing capable of supporting a tiltable or misaligned conduit, transmission line, or other inflexible cylindrical object.

Another and related object of the present invention is to provide an improved self-compensating through bushing, and one characterized by its ease of assembly and by the simplicity and economy of its parts.

Figure 1:
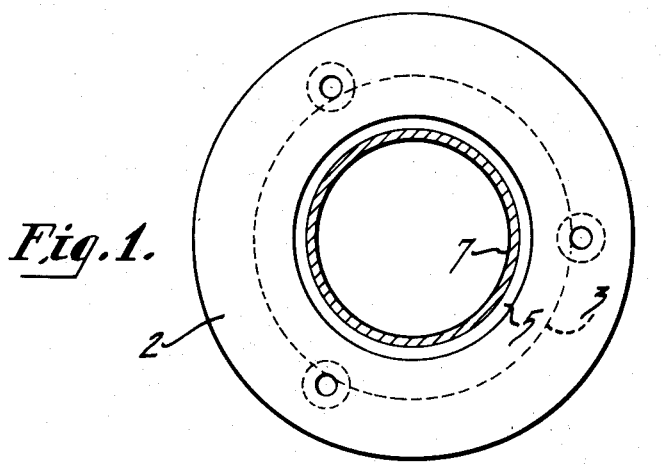
Figure 2:
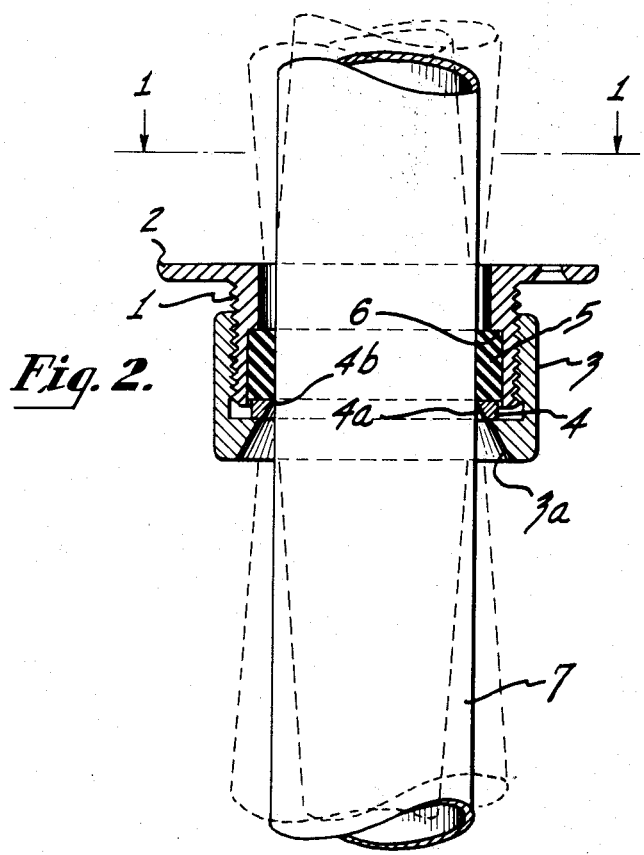

Other objects and advantages will be apparent and the invention itself will be best understood by reference to the following specification and accompanying drawing wherein:

Fig. 1 is a plan view taken on the line 1—1 of Fig. 2 and Fig. 2 is a sectional elevation of a straight-through bushing constructed in accordance with the principle of the invention to accommodate a tiltable transmission line or other inflexible cylindrical object.

The embodiment of the invention which has been selected for illustration comprises four separable parts including an externally threaded sleeve 1, which is provided with a mounting flange 2 for attaching the device to an apertured panel, not shown, a complementary threaded collar 3, an internal annulus 4 against which the collar 3 is adapted to bear and a rubber or other yieldable gasket 5 which is seated upon a shoulder 6 within the sleeve 1 and comprises a yieldable support for the annulus 4.

It will be observed upon inspection of Fig. 2 that the yieldably supported internal annulus 4 has an axially extending outwardly tapered opening 4a therein and that the inner end 4b of this tapered opening is only slightly larger than the cylindrical pipe or conduit 7 which it is designed to accommodate. On the other hand, the internal diameter of the hollow sleeve 1 and of the tapered inner surface 3a of the collar 3 is substantially larger than that of the said conduit. Thus, when the bushing is assembled about the conduit 7, the inner peripheral edge 4b of the yieldably supported annulus 4 comprises a bearing or fulcrum upon which the conduit may be tilted in any direction, a limited distance (in this case, 15°) determined by the internal diameter of the sleeve 1 and by the slant of the tapered surfaces 3a and 4a of the collar 3 and annulus 4.

In assembling the bushing, the collar 3 is first slipped over the end of the tube or conduit 7 and the annulus 4 and gasket 5 then placed after it on the conduit in the order mentioned. The end of the conduit is then passed through the sleeve 1 and the gasket and annulus placed within the sleeve onto the shoulder 6. The collar or nut 3 is then screwed up against the yieldably supported bearing or annulus 4.

It will now be apparent that the present invention provides a self-compensating through bushing capable of supporting a tiltable or misaligned conduit, transmission line or other inflexible cylindrical object.

What is claimed is:

1. A through bushing for supporting a cylindrical object, said bushing comprising a sleeve having a bore extending therethrough of a minimum diameter substantially larger than the outer diameter of said object whereby said object may extend through and be tilted within said sleeve, an annular member constituted of a resilient material disposed within said sleeve adjacent to an end thereof, the internal diameter of said annular member being sufficiently large to accept said object, and an annulus comprising an external bearing for said object yieldably supported upon said resilient member, the internal surface of said annulus terminating in an outwardly tapered terminal portion of a diameter sufficiently large to permit said tilting of said object within said sleeve.

2. The invention as set forth in claim 1, and wherein the external surface of said sleeve contains screw threads, and wherein an internally threaded annular collar adapted to be screwed-up on said externally threaded collar is provided for maintaining said tapered annulus on said yieldable member, said collar having an outwardly tapered bore which comprises a continuation of said outwardly tapered terminal portion of said annulus.

WILLIAM S. WESCHLER.
RICHARD PIERCE CORPORON.

REFERENCES CITED

The following references are of record in the file of this patent:

UNITED STATES PATENTS

| Number | Name | Date |
|---|---|---|
| 463,890 | Cross | Nov. 24, 1891 |
| 1,912,299 | Parker | May 30, 1933 |
| 1,925,335 | Murphy | Sept. 5, 1933 |

FOREIGN PATENTS

| Number | Country | Date |
|---|---|---|
| 7,713 | Great Britain | Apr. 15, 1893 |
| 1,382 | Great Britain | Jan. 22, 1894 |
| 74,752 | Austria | Oct. 10, 1918 |